Sept. 27, 1960 W. M. GROSVENOR, JR 2,954,305
PURIFICATION OF SUGAR SOLUTIONS
Filed June 22, 1959 11 Sheets-Sheet 1
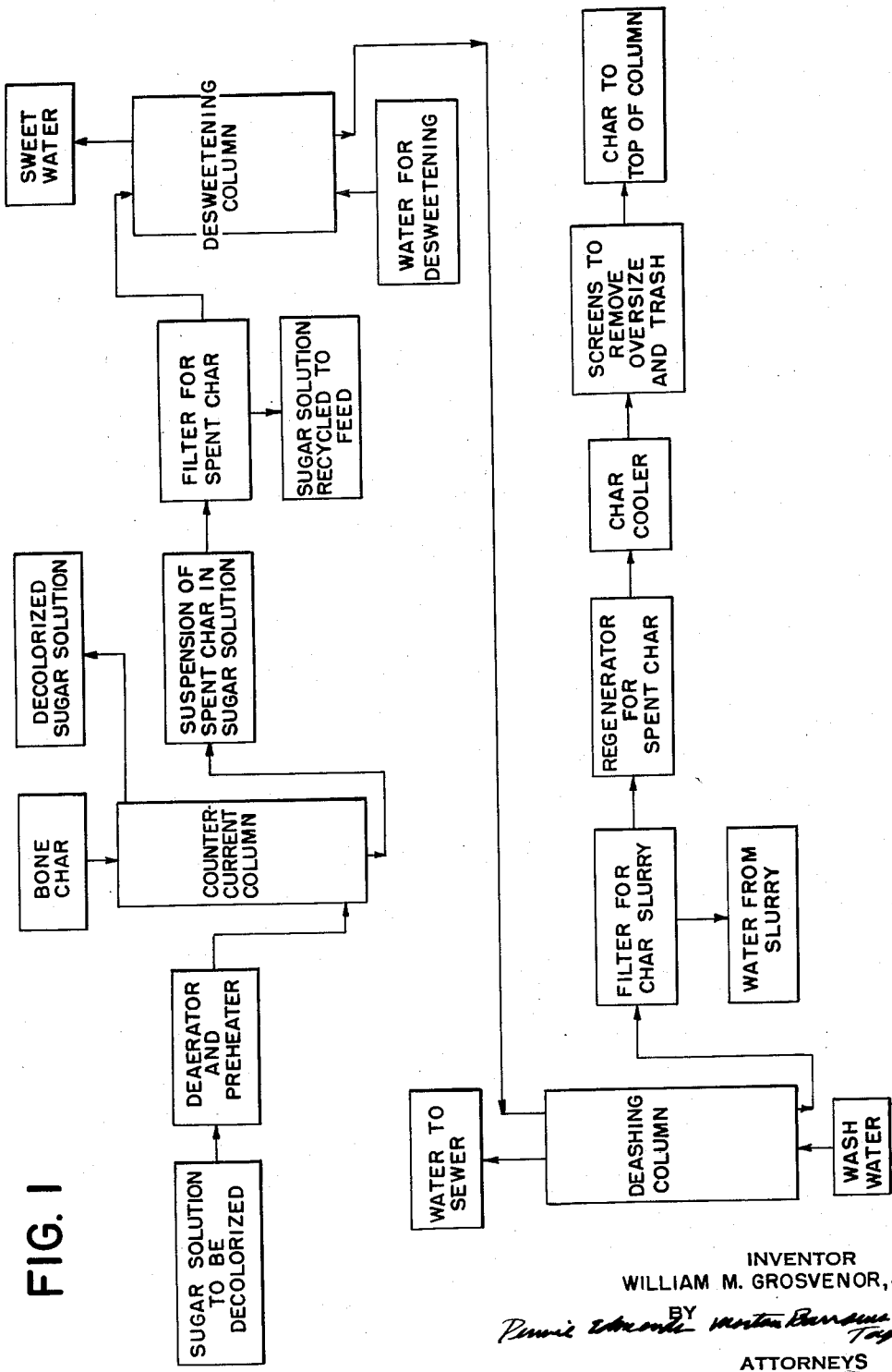
FIG. I
INVENTOR
WILLIAM M. GROSVENOR, JR.
BY
ATTORNEYS

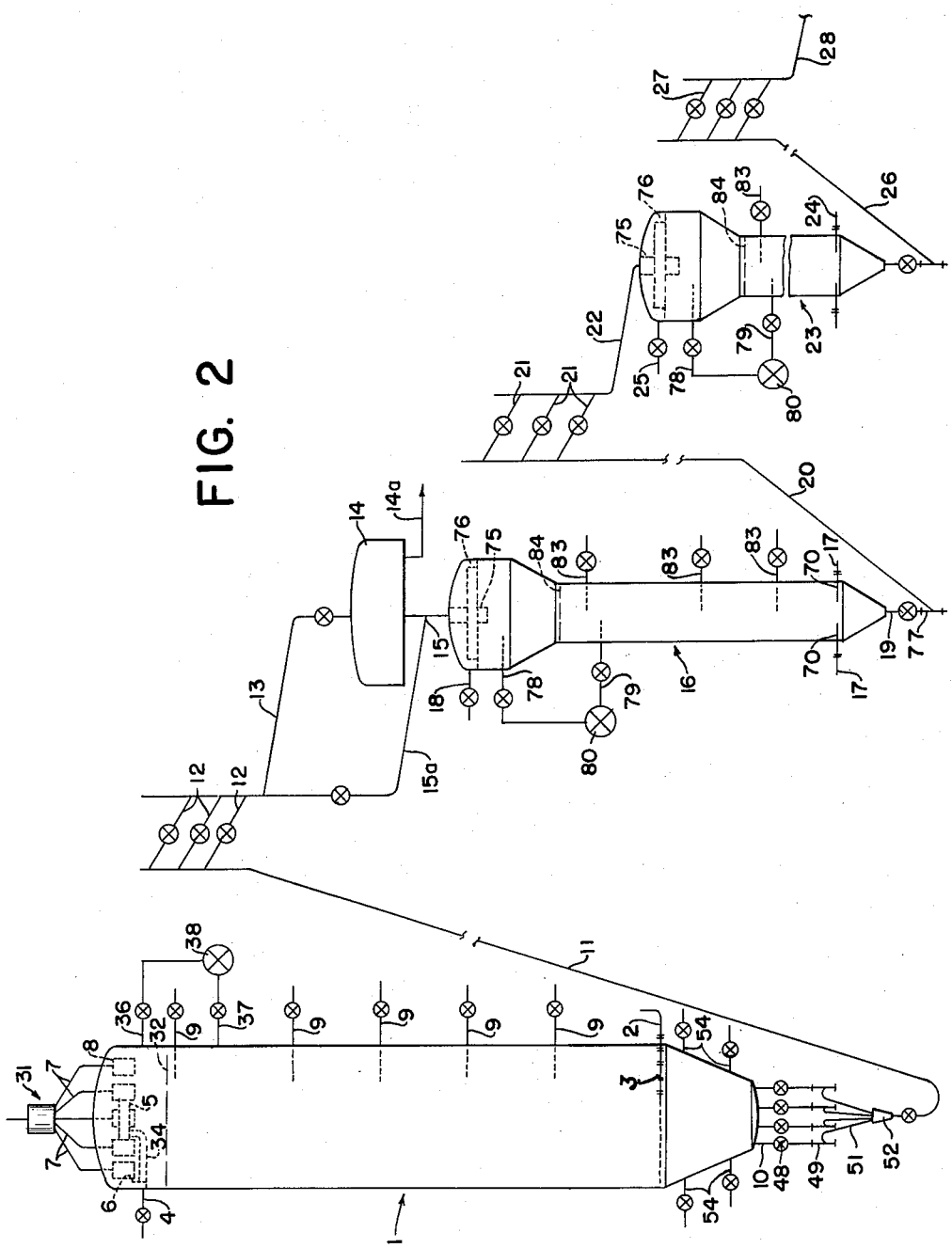

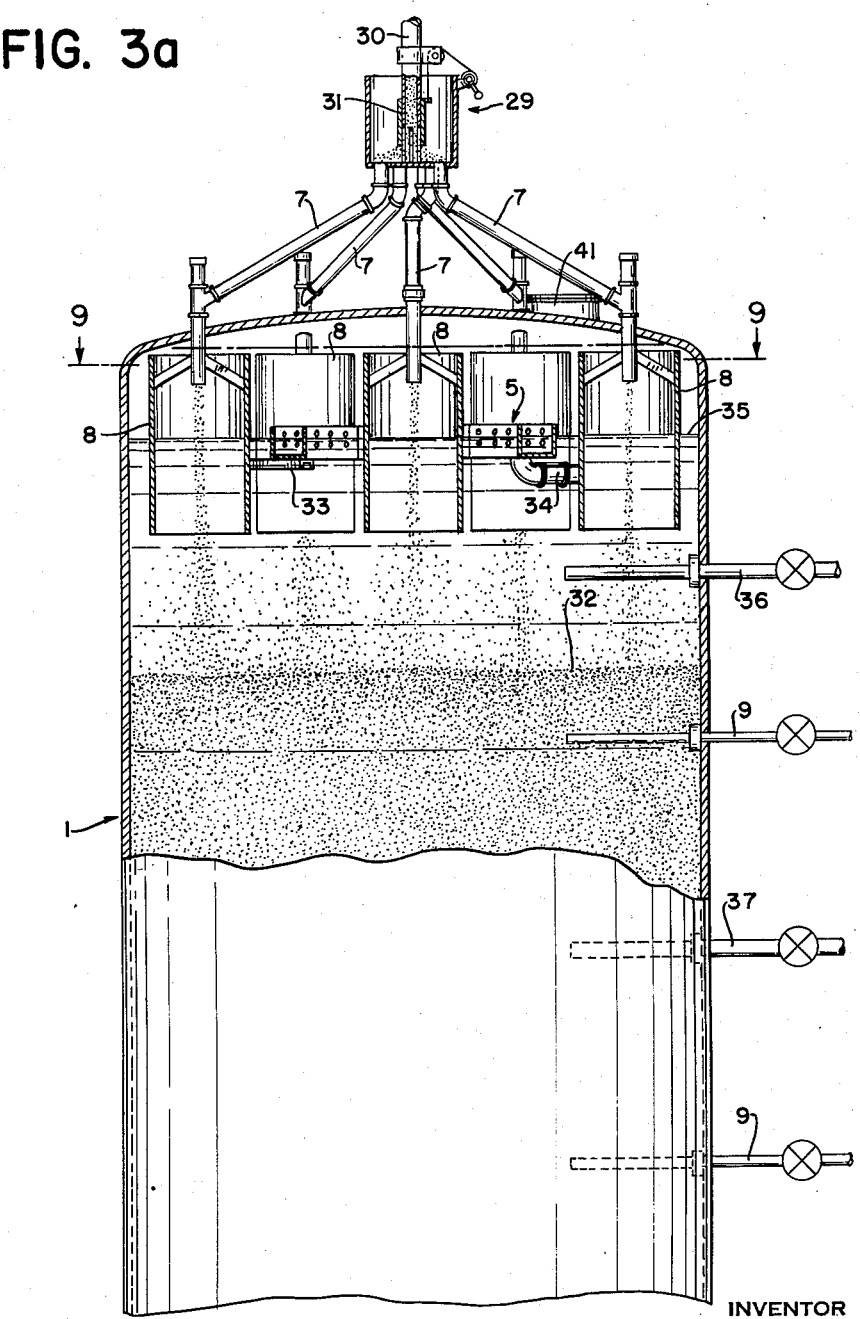

Sept. 27, 1960 W. M. GROSVENOR, JR 2,954,305
PURIFICATION OF SUGAR SOLUTIONS
Filed June 22, 1959 11 Sheets-Sheet 4

INVENTOR
WILLIAM M. GROSVENOR, JR.
ATTORNEYS

Sept. 27, 1960 W. M. GROSVENOR, JR 2,954,305
PURIFICATION OF SUGAR SOLUTIONS
Filed June 22, 1959 11 Sheets-Sheet 5

INVENTOR
WILLIAM M. GROSVENOR, JR.

ATTORNEYS

Sept. 27, 1960 W. M. GROSVENOR, JR 2,954,305
PURIFICATION OF SUGAR SOLUTIONS
Filed June 22, 1959 11 Sheets-Sheet 6

INVENTOR
WILLIAM M. GROSVENOR, JR.
BY
ATTORNEYS

Sept. 27, 1960  W. M. GROSVENOR, JR  2,954,305
PURIFICATION OF SUGAR SOLUTIONS

Filed June 22, 1959  11 Sheets-Sheet 7

INVENTOR
WILLIAM M. GROSVENOR, JR.

ATTORNEYS

Sept. 27, 1960  W. M. GROSVENOR, JR  2,954,305
PURIFICATION OF SUGAR SOLUTIONS
Filed June 22, 1959  11 Sheets-Sheet 8

INVENTOR
WILLIAM M. GROSVENOR, JR.
ATTORNEYS

Sept. 27, 1960 W. M. GROSVENOR, JR 2,954,305
PURIFICATION OF SUGAR SOLUTIONS
Filed June 22, 1959 11 Sheets-Sheet 9

INVENTOR
WILLIAM M. GROSVENOR, JR.
BY
ATTORNEYS

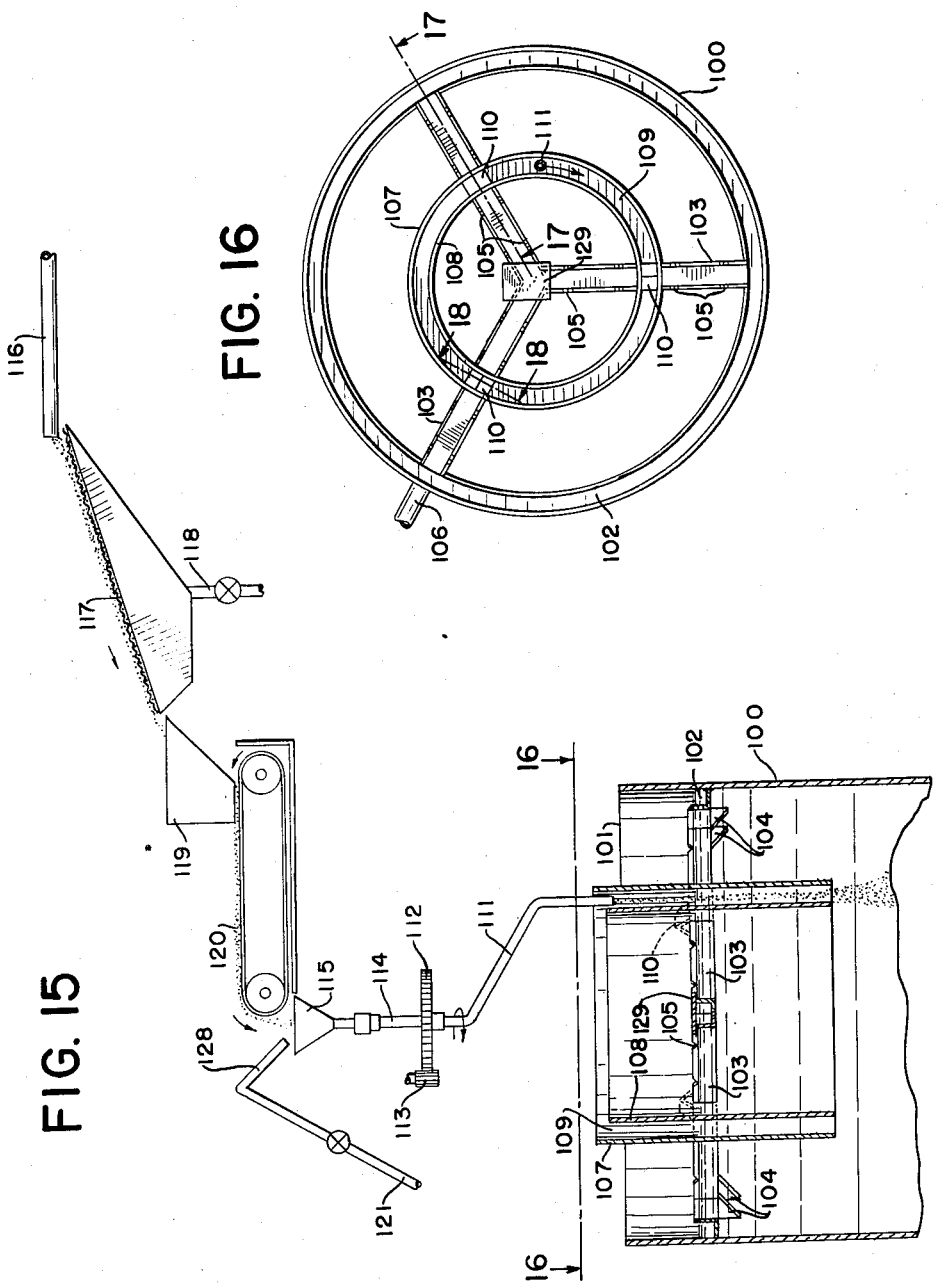

Sept. 27, 1960   W. M. GROSVENOR, JR   2,954,305
PURIFICATION OF SUGAR SOLUTIONS
Filed June 22, 1959   11 Sheets-Sheet 11

INVENTOR
WILLIAM M. GROSVENOR, JR.
ATTORNEYS

United States Patent Office

2,954,305
Patented Sept. 27, 1960

2,954,305

PURIFICATION OF SUGAR SOLUTIONS

William M. Grosvenor, Jr., Pelham, N.Y., assignor to The American Sugar Refining Company, New York, N.Y., a corporation of New Jersey Filed June 22, 1959, Ser. No. 822,003

9 Claims. (Cl. 127—55)

This invention relates to improvements in the purification of sugar liquors for the production of granulated sugar or syrups; and more particularly to an improved continuous counter-current process of purifying sugar solutions for the removal of color and other impurities therefrom.

The process of the present invention can be used in the purifying of different sugar solutions from different sources; but it is of particular advantage for the decolorizing and purifying of cane sugar liquors for the removal of color and other impurities therefrom.

The process of the present invention is a continuous counter-current process in which a hot sugar solution is passed upwardly through a downwardly flowing body of bone char or other decolorizing adsorbent, with regulated upward flow of sugar solution to maintain the bed of downwardly flowing adsorbent material in an expanded state, and with counter-current flow through a bed of sufficient length and with regulated supply of the adsorbent to produce a highly refined purified sugar solution continuously.

The decolorizing materials used in the present process include those which are used in the decolorizing and purification of sugar solutions in filter beds. And different decolorizing adsorbents can be used with different sugar solutions. The adsorbents commonly used for decolorizing cane sugar solutions include bone char, Synthad (a synthetic bone char, U.S. Patents 2,352,932 and 2,735,823), and other types of granular regenerable carbon-bearing materials, including Pittsburgh-type carbon CAL. For corn sugar or sucrose, bone char or granular activated carbons such as Pittsburgh types S.G. and S.G.L. carbon can be used. For beet sugar solutions, to remove floc-forming constituents therefrom, a synthetic, floc-forming-constituent-adsorbent such as Pittsburgh type carbon CAL is advantageously used.

In cane sugar refining, where decolorization of the sugar solutions is essential, it has been the common practice to accomplish decolorization to the desired extent by passing the defecated raw sugar liquors downwardly through a stationary bed of bone char or other types of granular regenerable carbon-bearing materials. These beds have a finite and limited capacity to remove color, ash or non-sugar solids, depending on the capacity of the adsorbent for the particular material to be removed. The first run of liquor through such a filter bed is the best one can obtain and, as the filtration progresses, the quality of the effluent as to color, etc., constantly deteriorates until a point is reached where an unacceptable product is produced, at which point the filter is used to treat low grade liquors, or it is washed free of sugar before regeneration of the carbonaceous material.

In conventional char filtration of cane sugar liquors, the liquors produced start off high in quality, so far as color, ash, etc., are concerned, but start to deteriorate as to these qualities until a point of unacceptability is reached. The quality of effluent from each filter is a material which varies, and the output of a multi-filter char house is, therefore, a variable blend of the best to the least acceptable as various filters are put on stream or as they are removed.

In the operation of such filters, it has been customary to add twice-filtered liquor to the empty filter and then to run in the dry, warm bone char until the filter is filled with the char and with twice-filtered liquor. The sugar solution to be purified then flows downwardly through the filter bed, first displacing the twice-filtered liquor before the flow of fresh liquor reaches the bottom of the filter and is discharged therefrom, and the first liquor drawn from the filter is the best and lowest in color. The filter is continued until the effluent sugar solution reaches an unacceptable color, and this occurs before the char has been utilized to its maximum extent for decolorizing.

The amount of sugar solution which can be decolorized in such a filter bed is limited. The amount of bone char required in the operation of such filters is around one-third of a pound of bone char per pound of sugar in the sugar solution being decolorized, with the result that a sugar refinery processing four million pounds of sugar per day requires around 1,300,000 pounds of bone char. And this amount of bone char has to be regenerated each day for reuse.

After a filter has thus been used and its use as the filter has been discontinued, it is full of bone char and sugar solution. It has been customary to remove the sugar solution from the bone char in the filter by adding water to displace the sugar solution and continuing the flow of water through the filter until the sugar is substantially completely removed. The resulting sweet water becomes increasingly dilute, as the washing continues, and, with dilution of the sweet water, considerable amounts of calcium and other ash constituents are also removed from the filter bed, as well as some of the color bodies and other organic constituents, with the result that the sweet water contains a relatively high concentration of ash constituents which are recirculated with the sweet water as it is reconcentrated for reuse as raw liquor in the process.

After the desweetening of the bone char in the filter, the washing with water is continued to complete removal of soluble inorganic constituents before the bone char is removed from the filter for regeneration. The desorption of ash constituents into the sweet waters, with the concentration and return of the sweet water, results in an increase in ash constituents in the sugar solutions which are subject to the filtration treatment.

In the operation of such a filter bed system for the decolorizing of sugar, each of the filters loses from around 30 to 50 percent of its productive time in sweetening off, washing to remove inorganic impurities, blowing down with compressed air, emptying the filter and refilling, with the result that a large number of such filters are necessary, for example around 50 to 70 filters in a refinery processing around four million pounds of sugar per day.

The improved process of the present invention is a continuous counter-current flow process which enables a highly purified decolorized sugar solution to be continuously obtained, with a radical reduction in the amount of bone char or the like required. It enables a continuous stream of decolorized and purified sugar solution to be obtained which is comparable with or better than the first flow of liquor from a conventional filter. It enables the bone char or the like to be more effectively and more completely utilized with a reduction in the amount of bone char required, amounting to about half of the amount required in the conventional filter system above referred to. It enables a sweet water of high concentration to be obtained relatively free from objectionable ash constituents. It enables the bone char to be used and the sugar solution purified in a continuous manner, with the decolorizing treatment, the sweetening off treatment, and the washing treatment carried out continuously, and without the large loss of unproductive time of the filters. It enables a radical reduction to be effected in the regeneration of the bone char for reuse, with corresponding reduction in bone char inventory at the refinery. The improved process can be carried out in the plant with a capital investment radically less than that of a filter-bed system and with greatly reduced operating labor costs.

According to the present invention, the cane sugar solution to be purified, of around 63° Brix, is first deaerated and preheated, and is then passed upwardly through a column of descending bone char or the like, of e.g., around 30 to 40 feet in height, and at a regulated rate which maintains the descending bed of bone char in an expanded condition, e.g., expanded from about 5 percent to 15 percent of its settled volume, but not expanded to the point which would fluidize the adsorbent bed to create turbulence. The bone char or other granular adsorbent is supplied continuously to the top of the bed, and is continuously withdrawn from the bottom of the bed, at a rate which insures that the adsorbent discharged at the bottom of the bed will have been substantially completely utilized, and at a rate that maintains the effluent sugar liquor from the top of the bed at the desired high degree of purity.

The rate at which the sugar solution is introduced and flows upwardly through the column to maintain an expanded bed will vary somewhat with the concentration of the solution and with the temperature. Cane sugar solutions will usually vary between 60° and 65° Brix, and the following table shows the approximately optimum rate of flow of the sugar solution at 60°, 63° and 65° Brix, and at 160°, 170° and 180° F. to give an expanded bed. The figures in this table represent approximately the optimum superficial velocities in feet per hour. By superficial velocity is meant a velocity on the assumption that the flow is through an empty column. The actual velocity will be a much greater rate because the flow is through the expanded bed of adsorbent material. The figures of this table are subject to a variation of around 15% to 20%.

| ° Brix | 160° F., ft./hr. | 170° F., ft./hr. | 180° F., ft./hr. |
|---|---|---|---|
| 60 | 7 | 8.5 | 10 |
| 63 | 5 | 6 | 7 |
| 65 | 4 | 5 | 6 |

The viscosity in centipoises of the sugar solutions of the above table are indicated by the following table, the figures representing the viscosities in centipoises at the different temperatures of 160°, 170° and 180° F.

| ° Brix | 160° F., cps. | 170° F., cps. | 180° F., cps. | |
|---|---|---|---|---|
| 60 | 6.7 | 5.8 | 5.0 | Visc. in cps. |
| 63 | 9.4 | 8.0 | 6.8 | |
| 65 | 12.0 | 9.8 | 8.2 | |

From the above tables, it will be seen that the rate of introduction of the sugar solution will vary both with the degrees Brix of the solution and with the temperature and is related to the viscosity of the solution.

In the operation of such a counter-current column, it is important to insure uniform distribution of the hot entering sugar solution over the cross-sectional area of the bed, and it is also important to withdraw the purified sugar solution uniformly from above the top of the bed. In the operation of such a bed, the hot entering sugar solution enters somewhat above the bottom of the bed, and around 85% of the sugar solution passes upwardly through the bed. The spent adsorbent material collects in the lower portion of the column, below the point of sugar solution admission, and is discharged continuously from the bottom of the column together with around 15% of the sugar solution entering the column.

The slurry of bone char or other adsorbent and sugar solution, continuously drawn off from the bottom of the column, is advantageously first subjected to a filtering operation, e.g., by passing it over a continuous filter to remove the excess sugar solution from it, and to leave in the bone char only the sugar solution adhering to the filtered char. The sugar solution thus drawn off is recycled for admixture with the feed to the column. The resulting bone char with adhering sugar solution is then subjected to a desweetening treatment, by passing it continuously downwardly through a column counter-current to a limited flow of fresh water added at the bottom, with the result that a concentrated sweet water, e.g., around 30° Brix, is continuously produced, in contrast with a sweet water varying from 34° to ½° Brix in the filter system. Only a liimted amount of water is required for counter-current upward flow through the adsorbent to effect removal of sugar therefrom, and the maintenance of a high concentration of sweet water coming off from the top of the tower limits or minimizes the amount of ash constituents removed therewith.

From the bottom of the sweetening off tower a slurry of water and char is passed to the top of a de-ashing column through which it flows downwardly in a continuous manner, counter-current to an upward flow of wash water, to effect de-ashing of the char, and the resulting water containing the salts goes to the sewer.

The de-ashed char from the de-ashing column is passed as a slurry to a filter to remove as much water as possible from it before it goes to the regenerator for the spent char. Regeneration is accomplished in a rotary kiln or multiple hearth furnace. The regenerated char is cooled, passed over a screen to remove oversized char and trash, and is then ready for return to the top of the counter-current refining tower for further use in the process.

The sugar solutions which are purified in the present process are sugar solutions such as are commonly refined in stationary filters. They may be between 60° and 65° Brix, but are commonly utilized at 63° Brix. A typical sugar liquor is one having a viscosity of about 8 cps. at 170° F., and an optical density of about 10.0 as determined on the Lumetron.

The temperature of the sugar solution in the counter-current operation is around 160–180° F., and advantageously around 170° F. The sugar solution is preheated and advantageously de-aerated before it enters the counter-current column. The de-aeration and preheating can advantageously be effected by introducing live steam into a tank of the sugar solution, maintained under a vacuum, to heat it to the desired temperature.

The counter-current column in which the purification of the hot sugar solution takes place is advantageously a column of around 9 to 12 feet in diameter and of a height to maintain an expanded bed of adsorbent material therein of around 30 to 40 feet.

The rate of introduction of the hot sugar solution to be purified is regulated so as to maintain the bed of adsorbent material in an expanded state, expanded to the extent of 5% to 15% of its settled volume, but in any event it should not be sufficient to cause fluidizing and turbulence in the bed. With the regulation of the rate of flow and expansion of the bed, and the proper distribution of the sugar solution over the cross-sectional area of the bed, a substantially lineal ascending column of sugar liquor is contacted continuously by a lineal descending column of adsorbent.

The flow of the sugar solution upwardly through the column is at a far greater rate than the flow of solid adsorbent downwardly through the column. Depending upon the temperature and viscosity of the sugar solution, the amount of sugar solution passing upwardly through the column may vary from around 3 volumes to 10 volumes of sugar liquor for each volume of bone char going down the column. With a greater rate of flow of the granular material down through the column and a correspondingly smaller number of volumes of sugar solution passing upwardly over each volume of bone char going down the column, a greatly increased decolorizing action can be obtained, so that, for example, a sugar solution can be attained comparable to twice-filtered liquor.

Thus, in the operation of the process, both the liquor, which rises, and the solid adsorbent, which descends, flow through the column in columnar form with different velocities. And conditions are established and maintained so that the flow of the liquid sugar solution and of the solid adsorbent are each substantially constant across the cross-section of the column. The expanded bed of absorbent settles as a column under controlled conditions through a flow of rising sugar liquor which is also constant in its rate of ascent.

As an illustration of the rate of flow, a sugar solution of 63° Brix at 170° F. may flow upwardly at the rate of 6 feet per hour superficial velocity, and the adsorbent may flow downwardly at the rate of about 0.9 foot per hour. The amount of adsorbent which is used and which flows downwardly will vary with the color of the sugar solution entering the column and will increase with sugar solutions of increased color content. The rate of addition of adsorbent is controlled to give a decolorized sugar solution coming off from the top of the column of low color and high purity.

At the top of the column the top of the bed of the adsorbent is located below the top of the body of liquid in the tower, where the liquor is removed. And the addition of the solid adsorbent to the top of the column is arranged to obtain a substantially uniform distribution of the fresh adsorbent. Thus, equal quantities of adsorbent may be supplied to a group of wetting-out chambers or soaking zones which permit the sinking of the de-aerated adsorbent through a space of clear liquor at the top of the main bed of adsorbent. The bone char or other adsorbent can also be supplied to the top of the column in the form of a slurry admixed with purified liquor and distributed uniformly over the top of the column, for example through an annular distributing chamber extending downwardly into the body of sugar solution in the top of the column.

As the adsorbent approaches the bottom of the column, it passes through a plane where the sugar liquor is introduced into the column. The manner of introduction of sugar liquor into the column is important and should be such as to insure substantially uniform distribution of the sugar liquor over the cross-sectional area of the column. This can be accomplished in various ways. In general, the introduction is made through a multiplicity of evenly spaced orifices of equal size so that there is a pressure drop of about 5 pounds per square inch across each orifice. This provides a substantially even flow of liquor into the column across its entire cross-section.

The liquor can also be introduced into a chamber in the column having a plate above it with a multiplicity of holes through which the liquor flows into the column. Where such a plate is provided, passages are also provided from the topside of the plate to permit the adsorbent to be removed therethrough.

If the introduction of the liquors is made by a sparger system, having a multiplicity of orifices evenly disposed across the entire cross-section of the column, the adsorbent can flow down around and between the sparger pipes to a multiplicity of outlets in the bottom of the column, conically connected to the main cross-section of the column.

Provision should be made for preventing the adsorbent from coming in contact with the orifices, both during the operation and when the column is shut down, such as goosenecks in the plate system, or by skirts in the sparger where the introduction is downward.

The introduction of the hot sugar solution into the column is above the bottom of the column. And the flow of liquor into the plane of the cross-sectional area of the column divides itself into two streams. The main portion, about 85%, of the stream flows up the column where the liquor-to-char ratio is about 6.5:1 by volume. The balance, about 15%, flows down with the adsorbent and acts as the hydraulic carrier stream to remove the char from the bottom of the column. The relative amount of sugar solution which passes downwardly and out of the bottom of the column with the char will vary with the rate of char supplied and withdrawn.

The adsorbent from each of the multiplicity of outlets at the bottom of the column is led through small diameter pipes to a collecting cone from which it is carried in small diameter pipes up the outside of the column to a point intermediate between the plane of liquor entry and the level of liquor take-off near the top of the column. At this point, there are a multiplicity of take-offs, each with its own valve, vertically disposed at different levels. The opening of any one of these take-offs, provides a different hydrostatic head, and therefore a different flow of liquor through the small diameter piping. In this way, the rate of take-off of the adsorbent from the bottom of the tower can be controlled. This flow of the adsorbent and the sugar solution is of a sufficient velocity in the small piping to fluidize the adsorbent and carry it out of the system at a rate determined by the height of the valve opened. In this way, the rate of removal of the adsorbent is controlled.

The introduction of the adsorbent at the top of the column is advantageously through a number of soaking zones which project down into the liquor above the top of the adsorbent bed to guide the settling of the adsorbent to a point still below the surface of the liquor, and to provide a disengaging space where liquor and adsorbent can separate to minimize the carry-over of adsorbent with the stream of liquor rising in the column. Provision is made for controlling the rate of addition of adsorbent to the top of the column, and to the different soaking zones, advantageously such that a single adjustment varies the flow of a dry adsorbent to each of the zones. Another advantageous method of introducing the adsorbent at the top of the column is by forming a slurry of the adsorbent with the purified sugar solution and introducing the resulting slurry into the top of the column through distributing devices arranged to obtain uniform distribution of the slurry in the column, for example, through an annular passage extending down into the body of liquid at the top of the column and terminating above the top of the adsorbent bed in the column.

To permit the columnar flow of liquor at the top of the column, a multiplicity of overflow orifices are spread across the surface, allowing the liquor to flow into a take-off trough at a multiplicity of points across the cross-sectional area of the column.

It has been found that passing the sugar liquor up such a column with an expanded bed depth of about 27 feet, and with a liquor-to-char ratio of about 6.5 volumes of liquor to one of char, accomplishes about 95% removal of color bodies and a 90% to 95% removal of the calcium content of the liquor, probably as the sulfate. The potassium and sodium levels are not essentially affected, using bone char, while the magnesium level is somewhat reduced.

In the operation of the process, care should be taken to make sure that the pH of the sugar liquors in the column is kept at a pH of 7.0 or above, as the color removal with bone char suffers on the acid side. Care should thus be taken to make sure that the bone char is regenerated so that the pH of the liquors in the column will be maintained at the desired pH or, if necessary, the liquor fed should be raised in pH to accomplish this.

The char coming from the bottom of the column is in the form of a slurry in the sugar solution, the sugar solution acting as a carrier liquor for the char. The char is treated to separate it from the admixed sugar liquor. This is advantageously effected by first filtering the slurry to recover most of the sugar solution therefrom, and the sugar solution thus separated can be returned for admixture of the raw sugar entering the process. The filtered char will still retain some sugar solution adsorbed by it after the filtration. This sugar is advantageously recovered by a counter-current treatment of the wet char in a tower in which the char is introduced at the top in a limited stream of fresh water at the bottom. Such a column can be used to wash and de-sweeten the adsorbents from several decolorizing columns.

The de-sweetening of the wet char is accomplished with the use of a minimum ratio of water to char, of the order of 0.5 volume of water per volume of char. The sugar solution is then removed at the top of the column as a fairly concentrated sugar solution of around 30° Brix, and relatively free from ash impurities. The char removed from the bottom of the de-sweetening column is carried as a slurry with water to a de-ashing column. At this point, the water carrying the char should show less than 0.1° Brix. By keeping the water used to de-sweeten the wet char to a minimum, the recirculation of inorganic ash-forming ingredients is minimized, since they are adsorbed from the char on a concentration level basis, and a relatively high concentration of sugar is maintained at the top of the column.

From the de-sweetening column, the adsorbent is carried hydraulically to another washing or de-ashing column where the char is washed to rid it of inorganic adsorbent material. This washing is advantageously accomplished in a counter-current tower from the top of which the water is sent to the sewer.

The slurry of char and water from the bottom of the de-ashing column is carried or may be pumped to a de-watering device or filter where, by means of gravity, suction, and/or a current of hot air, the water content of the char is reduced below 30 percent, preferably close to 20 percent.

The de-watered char is then carried to equipment for thermal regeneration or revivification. A multiple hearth furnace or a rotary type kiln are suitably provided and equipped to expose the adsorbent to a minimal oxidizing atmosphere of 900° to 1800° F. The adsorbent is then cooled to well below the exit temperature, i.e., below 220° F., and after screening to remove oversized char and trash, and gravity separation to eliminate high density material, is mechanically returned to the top of the tower for reuse in the process.

Instead of returning the dried char or other adsorbent from the regenerating furnace to the top of the column, it can be formed into a slurry with purified sugar solution and pumped back to the top of the column and introduced as a slurry into the top of the column.

The invention will be further described in connection with the accompanying drawings, showing a flow sheet of the process, and apparatus suitable for carrying out the process of the invention, but it will be understood that the invention is not limited thereto.

In the accompanying drawings,

Fig. 1 is a flow sheet illustrating the process;

Fig. 2 shows, in a somewhat conventional and diagrammatic manner, an arrangement of the counter-current column, de-sweetening column and de-ashing column;

Fig. 3a shows the top of the countercurrent column partly in central vertical section and partly in elevation;

Fig. 9 shows a section through the column taken on the line 9—9 of Fig. 3a;

Fig. 15 shows a modified form of construction of the top of the counter-current column with provision for a modified form of supply of the adsorbent thereto;

Fig. 16 is a top view of the column of Fig. 15;

In the flow sheet of Fig. 1, the sugar solution to be decolorized, such as defecated, washed, raw cane sugar liquors, is passed through a de-aerator and preheater where, e.g. by the action of steam under a vacuum, the sugar solution is de-aerated and preheated, e.g. to a temperature of around 170° F., before it enters the counter-current column near the bottom thereof. The decolorizing adsorbent is shown as bone char entering the counter-current column at the top and flowing downwardly therethrough, while the hot sugar solution passes upwardly through the expanded bed of adsorbent and is taken off from the top of the column as decolorized sugar solution.

The spent char is taken off from the bottom of the column as a slurry or suspension of the char in the sugar solution and is passed over a continuous filter which removes the excess sugar solution, which can be recycled for admixture with the feed to the column. The spent char, after filtering, then enters the top of the de-sweetening column and passes downwardly therethrough while water for de-sweetening enters at the bottom and passes upwardly at a rate which enables sweet-water of high sugar content to be drawn off the top.

From the bottom of the de-sweetening column, the spent char in slurry form is passed to the top of the de-ashing column and passes downwardly therethrough, while wash water enters the bottom of this column and the water from the top of the column goes to the sewer.

The char slurry from the bottom of the de-ashing column goes to a continuous filter to remove water from it before it passes to the regenerator for the spent char, which may be a rotary kiln or multi-hearth furnace. The regenerated char is then passed to a cooler and over screens to remove oversize and trash, a part of the stream may be passed over a gravity separator to remove overdense char, and the char is then ready to return to the top of the counter-current column.

The counter-current column is shown conventionally in Fig. 2 and in more detail in Figs. 3 to 12. This counter-current column 1 is a cylindrical column, e.g., 12 feet in diameter and about 40 feet in bed height, and provided with insulation and heating means (not shown).

Figure 5:
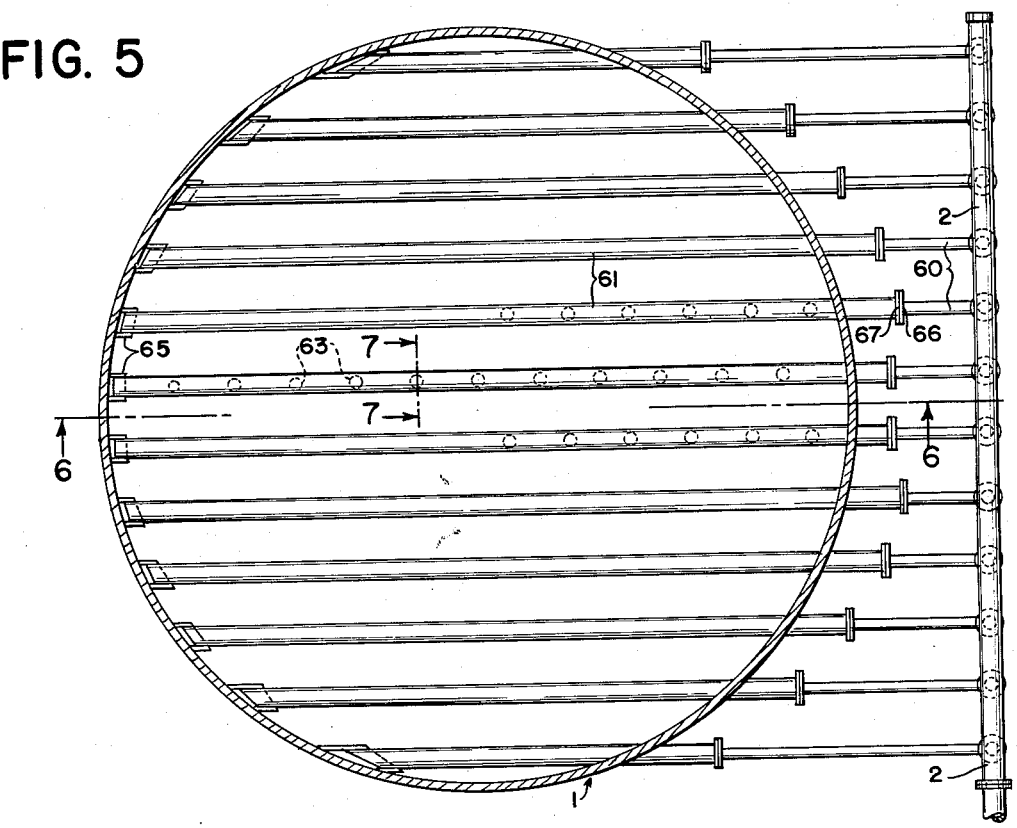
Fig. 5 is a section on the line 5—5 of Fig. 3b, showing the inlet piping for the sugar solution.
Figure 6:
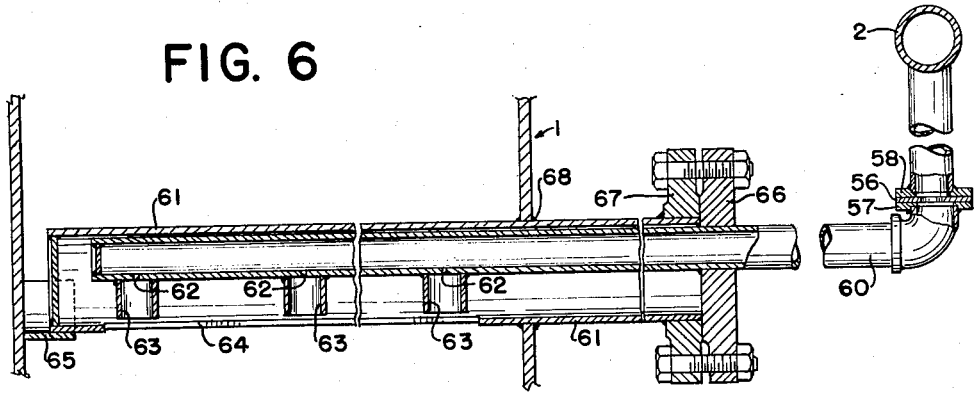
Fig. 6 is an enlarged sectional view with parts broken away, taken on the line 6—6 of Fig. 5.

The column has a sugar inlet 2 near, but somewhat above, the bottom of the column leading to distributing pipes 60, shown more particularly in Figs. 5 and 6. Near the top of the column is the purified sugar outlet pipe 4, connected with the overflow device 5 and the trough 6, shown more particularly in Figs. 8 to 10.

The bone char or other adsorbent is fed through a series of lines 7 to the top of the column and passes downwardly through a series of soaking chambers 8 and then downwardly through the body of sugar solution above the expanded bed to the top of this bed, indicated at 32. The lines 7 are inclined at a sufficient angle to permit free flow of the adsorbent therethrough.

On the side of the column 1 is a series of sample lines 9 extending into the column to permit samples of sugar solution to be taken out at different levels for test purposes. The portions of the sample lines inside the column have inlet openings for drawing off the sugar solution. And each of these sample lines is surrounded by a screen (not shown) to prevent escape of adsorbent with the sugar solution.

From the conical bottom of the column 1, lines 10 permit discharge of the char slurry in a manner hereafter described, and this slurry passes through the pipe 11 to a series of cross-over pipes 12, located at different levels and each provided with its own control valve so that, by opening one or another of these valves, the discharge level of the slurry can be controlled and the differential level from the top of the liquid in the column 1 and the slurry overflow regulated.

The slurry passes through the line 13 to the top of a deliquoring device 14 to remove as much as possible of the sugar solution from the spent char before it passes to the de-sweetening column 16 through the line 15. The sugar solution is drawn off through the line 14a. A by-pass line 15a permits passage of the slurry, without deliquoring, directly to the top of the de-sweetening column 16.

Figure 13:
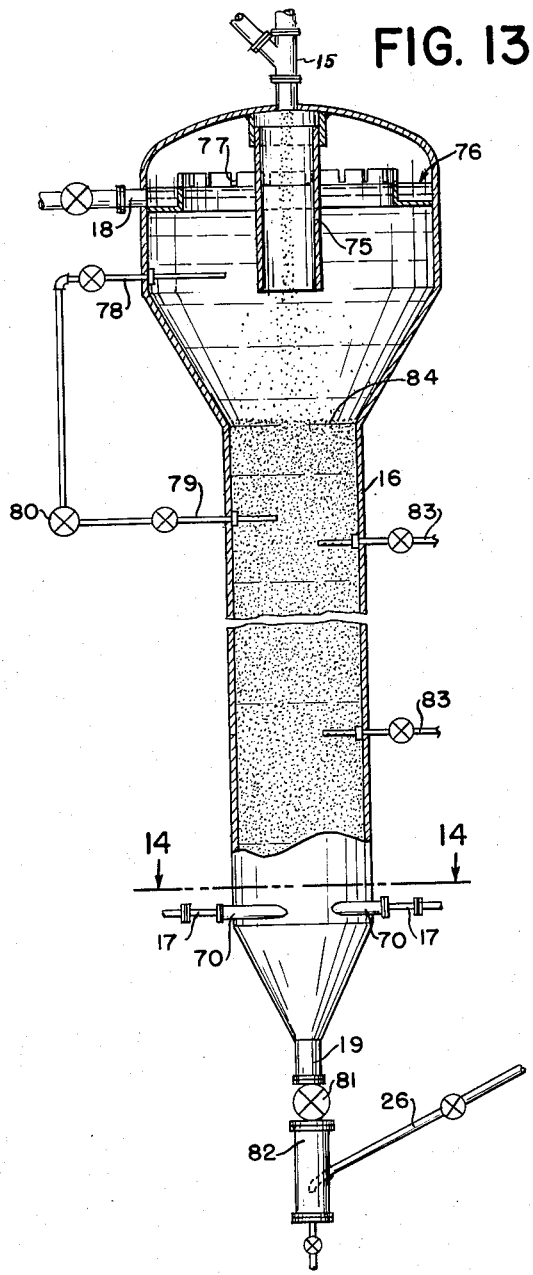
Fig. 13 shows, partly in section and partly in elevation, a form of de-sweetening and de-ashing column.
Figure 14:
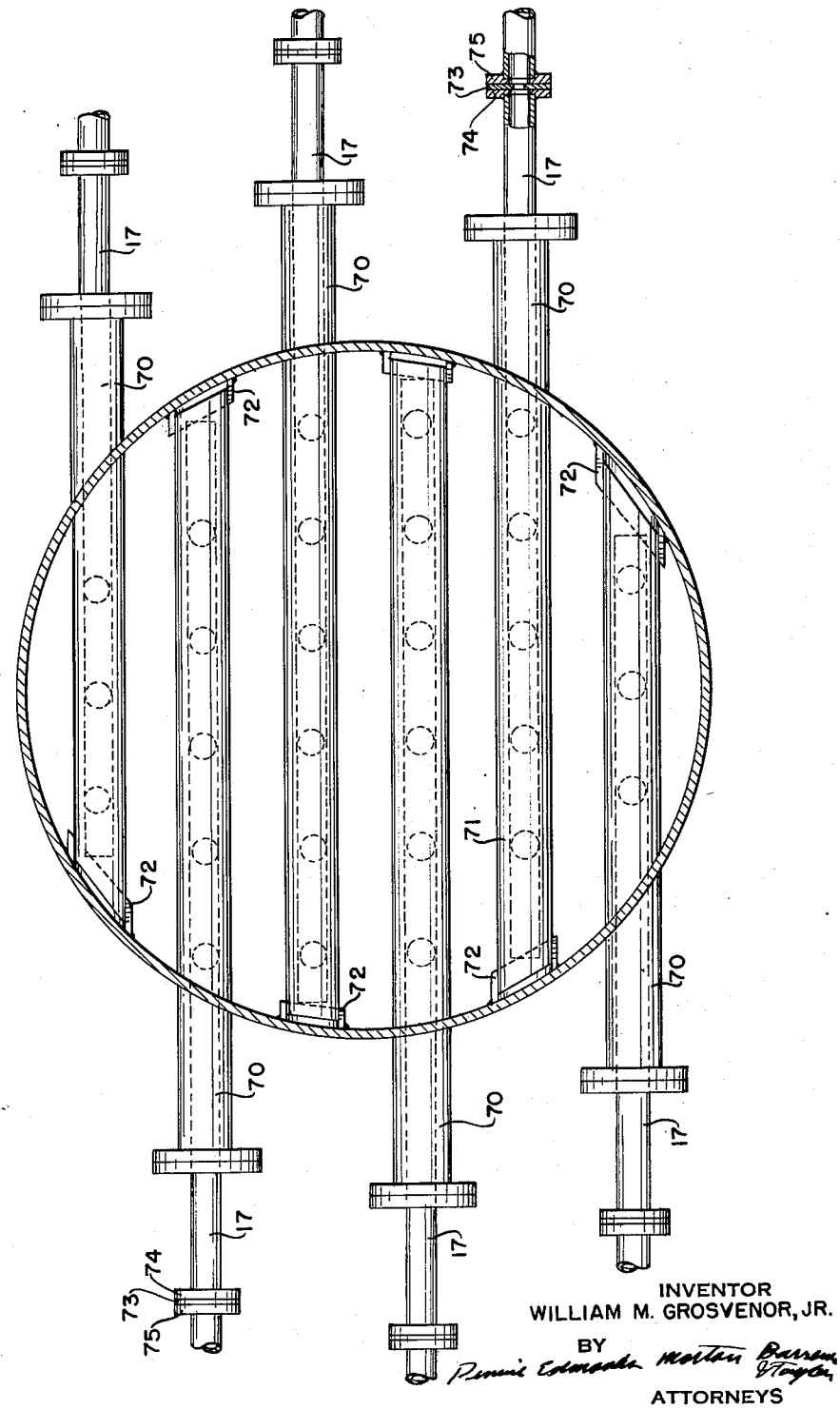
Fig. 14 is a section taken on the line 14—14 of Fig. 13, showing the inlet piping for this column.
Figure 17:
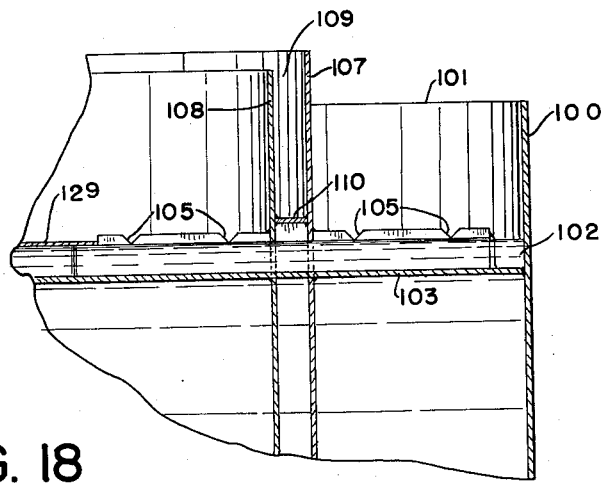
Fig. 17 is an enlarged section taken on the line 17—17 of Fig. 16.
Figure 18:
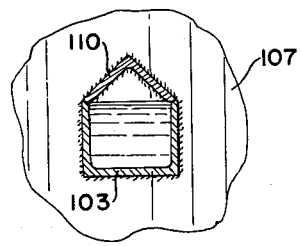
Fig. 18 is an enlarged section taken on the line 18—18 of Fig. 16.

The de-sweetening column 16 has a water inlet 17 near the bottom, leading to distributing pipes shown in Fig. 14. The top of this column has a sweet water outlet 18, leading from a collecting trough shown in Fig. 13. The spent bone char enters the top of this column through the line 15, and the slurry of bone char and water passes from the bottom of the column through the line 19 and upwardly through the line 20 to a series of cross-over lines 21, by which the overflow level is controlled and the differential height between the liquor level in the column 16 and the overflow line regulated.

The slurry of bone char then passes through the line 22 to the top of the de-ashing column 23, of the same construction as the de-sweetening column 16, this column having a water inlet 24 at the bottom and an outlet 25 at the top leading to the sewer, and a slurry outlet at the bottom discharging through the line 26 to a series of cross-over lines 27 similar to the cross-overs 12 and 21 above referred to. The de-ashed slurry then passes through the line 28 to a filter such as illustrated conventionally in Fig. 1.

Only one counter-current column 1 is shown in Fig. 2. Two or three columns of similar construction can be arranged to operate in parallel and with discharge of the spent char from all of these columns in slurry form into the same de-sweetening column.

Fig. 2 is not intended as a scale drawing and the location or elevation shown for the cross-over pipes 12, 21 and 27 is not intended to illustrate the actual location or elevation which, in each case, will be determined by the differential head, between the liquid level in the column or tower and the cross-over line, to insure proper flow of the slurry from the bottom of the tower or column to the cross-over line.

The column construction is illustrated in more detail in Figs. 3 to 12.

Figure 3B:
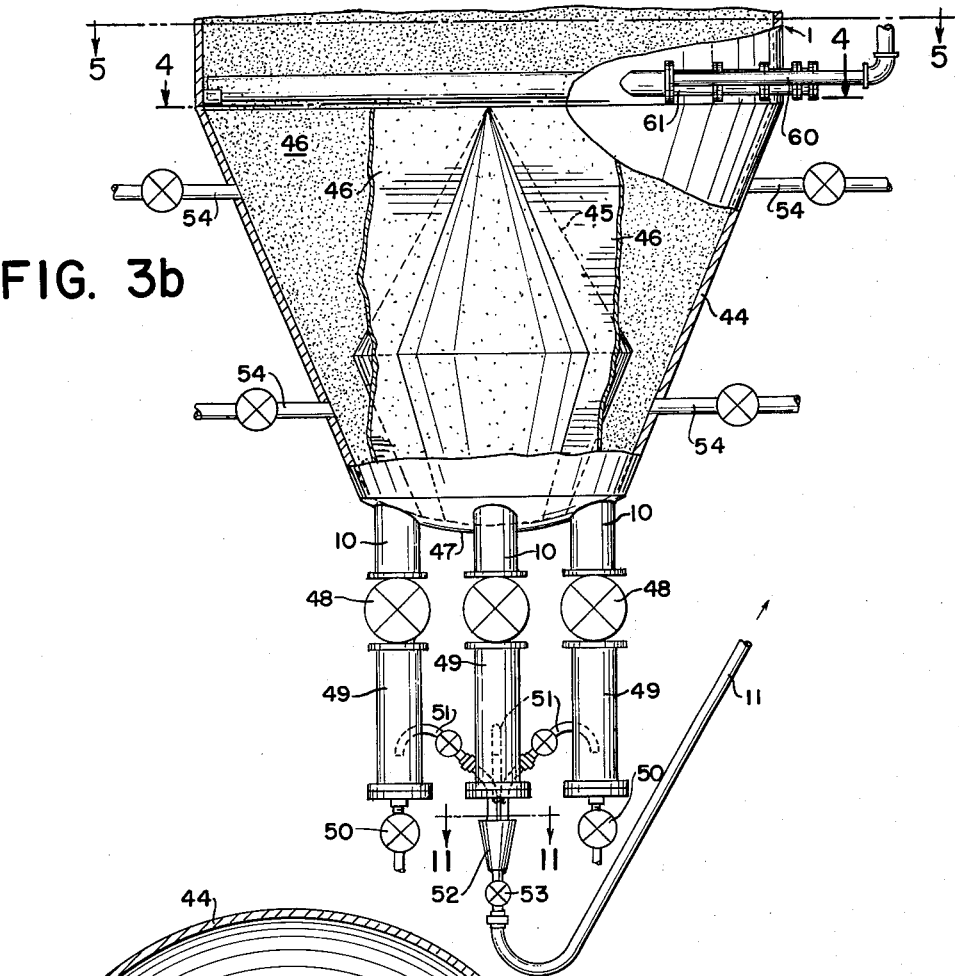
Fig. 3b shows the bottom of the countercurrent column partly in section, partly in elevation, and in part with parts broken away.

Referring to Fig. 3a, the bone char is supplied through the line 30, which has a series of slots at its lower end surrounded by the sliding sleeve 31 which is adjustable to different levels to permit increase or decrease of the amount of char supplied through these slots to the chamber 29, from which the char is fed to the supply lines 7 and the soaking chambers 8. The soaking chambers 8 are supported by brackets from the lower ends of the pipes 7. The soaking chambers extend some distance down into the sugar solution, so that the dried char will pass downwardly through the soaking chambers and be freed from air, and will spread out and pass downwardly, through the rising sugar solution, to the top of the expanded bed indicated at 32.

Figure 8:
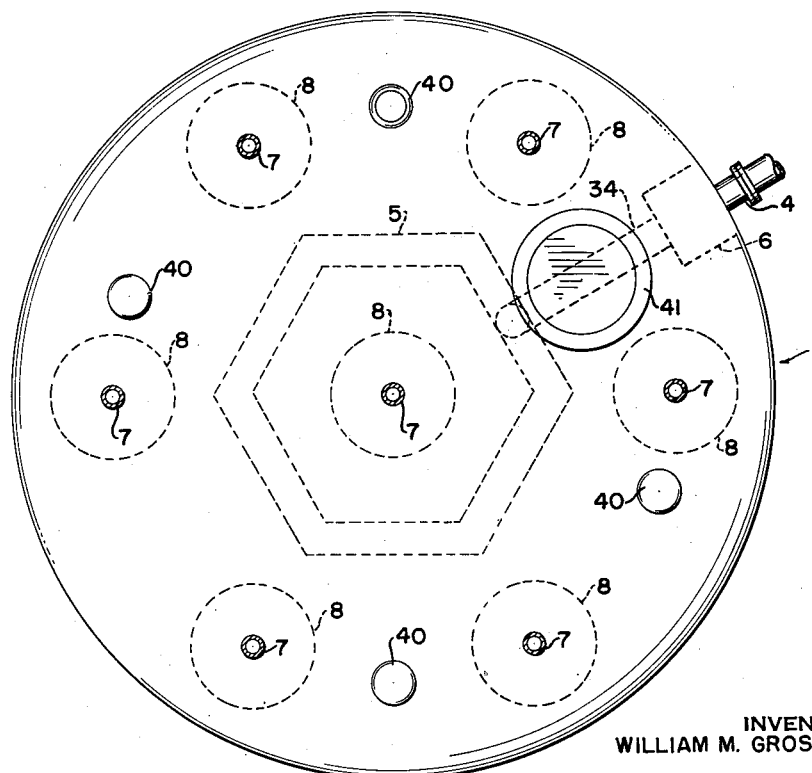
Fig. 8 shows a top view of the column.
Figure 9:
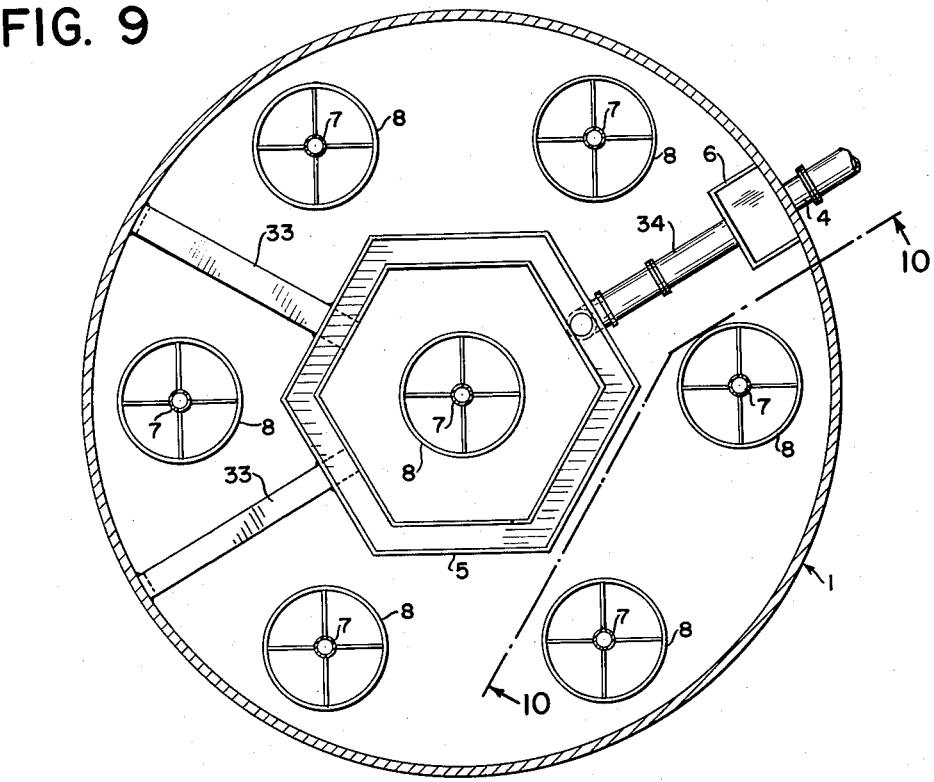
Figure 10:
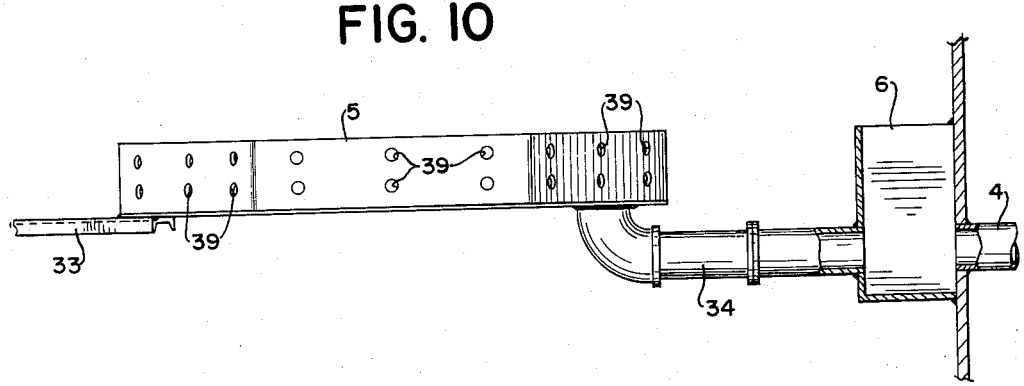
Fig. 10 is a view taken on the line 10—10 of Fig. 9, showing the overflow chamber and draw-off.
Figure 11:
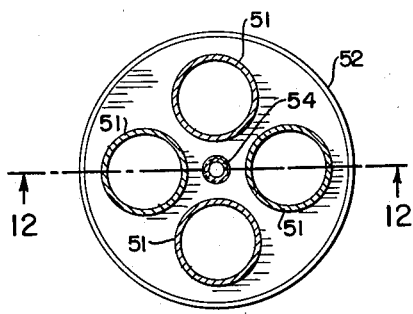
Fig. 11 is a view taken on the line 11—11 of Fig. 3b.
Figure 12:
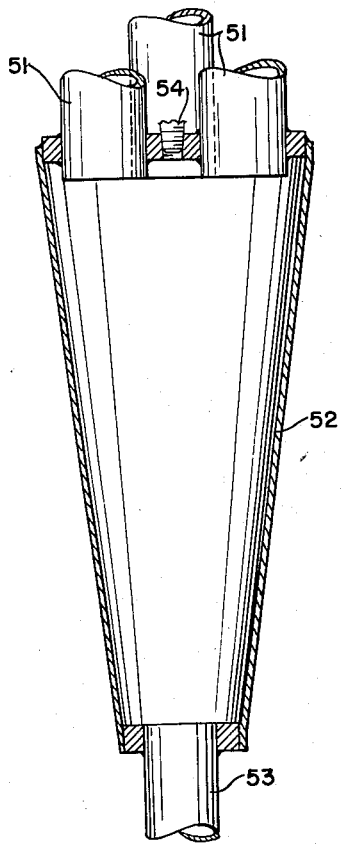
Fig. 12 is a central section taken on the line 12—12 of Fig. 11.

The overflow device 5 shown in Fig. 3a, and in Figs. 8, 9 and 10, is a trough, hexagonal in shape, supported by brackets 33 from the wall of the column and connected with the trough 6 by the line 34. The overflow trough 5 has two series of holes 39 located at different levels, both on the inside and the outside of the trough. The level of sugar solution is indicated at 35, but will vary somewhat, and in general will be at or above the lower row of holes 39. As the level rises to the upper series of holes, there is an additional overflow to maintain the liquid level from rising materially above the upper row of holes.

Provision is made for observing or locating the top of the expanded bed within the column. This level can be observed through a sight glass or window (not shown) located in the side of the column. The device illustrated in the drawing for this purpose is a differential pressure cell 38 connected with two pressure taps or pipes 36 and 37 extending into the column, and with the pipe 36 located in the liquid space above the expanded bed. By calibrating the differential pressure cell 18 so that the difference in hydrostatic height between the two tap pipes 36 and 37 is "zeroed" out, the pressure drop across the taps, when the bed top lies between them, can be read on the differential pressure scale. This pressure drop is due to the resistance to upward passage of the liquor through the solid settling adsorbent. The measurement of this pressure drop provides one indication of the need of increasing or decreasing the adsorbent feed, if the bed level falls or rises.

At the top of the column shown in Fig. 8 are openings 40 through which testing devices can be introduced to check on the level of the expanded bed. A manhole 41 is also shown in the top of the tower.

Figure 4:
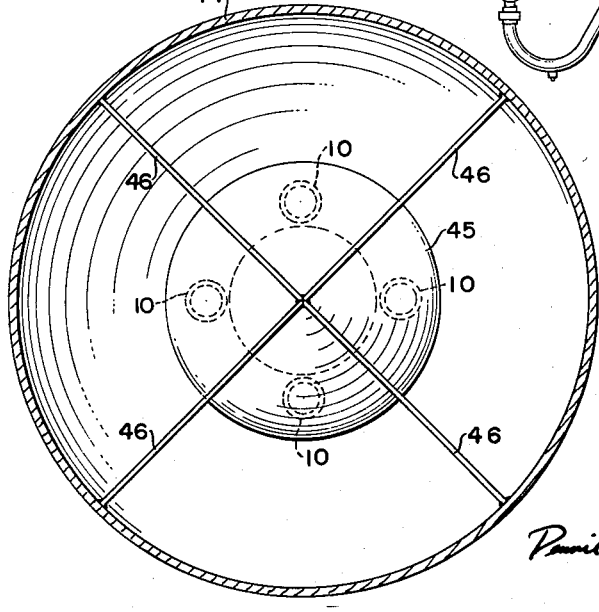
Fig. 4 shows the bottom of the column taken on the line 4—4 of Fig. 3b.

The bottom of the counter-current column is conical in shape, as indicated at 44, with a rounded bottom 47, and located within this conical bottom portion is a cone element 45 with an upper conical portion and a lower inverted frusto-conical portion resting on the bottom of the tower. Between this conical member and the conical bottom of the tower are four partitions 46 dividing the lower portion of the column into four compartments, as illustrated in Fig. 4, each of these compartments having a pipe 10 extending downwardly from the bottom thereof. The arrangement is such that the spent bone char or other adsorbent passing downwardly below the sugar liquor inlet pipes will flow by gravity, in suspension in the sugar solution, downwardly to the outlet pipes 4. A series of one or more inlet pipes 54 are arranged to inject additional sugar solution, when necessary, to maintain the spent bone char in a sufficient state of fluidity.

Each of the four outlet pipes 10, extending downwardly from each of the four compartments formed by the partitions 46, is connected through a full opening valve 48 to a lower cylindrical portion 49, with normally closed outlet valves 50 at its lower end. From each of these vertical sections 49 an upward and outward bent pipe 51 extends to a conical member 52, shown in Fig. 12. The valved outlet 53 from the cone 52 leads to the pipe 11 for carrying the slurry to the de-sugaring tower. The arrangement is such that the slurry collecting in the bottom of the tower is collected in four compartments, from each of which the slurry is drawn off and collected in cone 52 and then transported through the line 11 to the de-sweetening column.

The arrangement of the sugar inlet pipes, indicated conventionally at 3 in Fig. 2, is shown in more detail in Figs. 5 and 6. The header 2 for the incoming hot sugar solution is connected with a series of branch pipes 60 extending into and across the bottom of the column, and each of which pipes is surrounded within the column with larger outer pipes 61. Each of these pipes 60 has small openings 62 spaced apart equal distances, and each of which is surrounded by a downwardly extending cylindrical pipe 63. The larger outer pipes 61 have a longitudinal slot 64 shown in Figs. 6 and 7, this slot being of a width equal to the diameter of the depending cylindrical pipes 63 attached to the smaller pipe. The larger pipes are supported at their far ends by brackets 65 on the side of the column and, near their inlet ends, are welded to openings 68 in the side of the column. Flanges 66 are welded to the small inlet pipe 60, and similar flanges 67 are welded to the larger outer pipes 61, and these are bolted together as shown in Fig. 6.

The pipes 60 vary in their length within the column and in the number of outlet openings. In order to regulate the supply and pressure in these different pipes, flange orifices 56 are located between flanges 57 and 58 in each of the pipes 60. These orifices are predetermined and regulated to insure a proper uniform supply of the hot sugar solution and discharge of the solution from the different openings of the series of supply pipes in a substantially uniform manner over the cross-sectional area of the column.

The arrangement of the inlet pipes and of the supply of sugar solution thereto is thus such as to insure uniformity of pressure and discharge through the different orifices downwardly near the bottom of the column. The arrangement of the sugar solution outlets is such as to protect them from interference with the downwardly flowing bone char or other adsorbent material.

The de-sweetening column 16, shown in Figs. 13 and 14, has a depending cylindrical inlet member 75 extending downwardly from the entrance of the spent bone char, or spent bone char slurry, through the line 13 or 15, this cylindrical portion extending downwardly some distance below the normal liquid level of the column. Near the top of this column is an overflow trough 76 with overflow notches 77 for the overflow of the sweet water from the column into the overflow trough, and thence out through the sweet water outlet 18.

Figure 7:
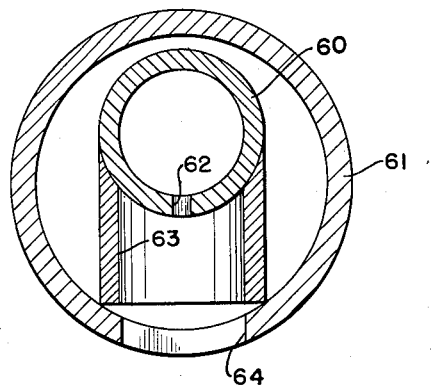
Fig. 7 is an enlarged view through one of the inlet pipes, taken on the line 7—7 of Fig. 5.

At the bottom of the de-sweetening column, water enters at 17 through a series of pipes 70 surrounded by larger outer pipes 71 supported at their inner ends by brackets 72 and having downwardly extending openings through which water is introduced. The construction and arrangement of these inlet pipes is similar to that of the sugar solution inlet pipes at the bottom of the countercurrent column, as illustrated in Figs. 6 and 7, the small openings in the water-inlet pipes having downwardly depending surrounding cylinders, as illustrated in Fig. 7, and the outer larger pipes 71 having slotted openings at the bottom, such as illustrated in Fig. 7.

In order to insure uniform discharge of water through the different pipes into the bottom of the tower, each water inlet pipe 17 is provided with a flange orifice 73 located between flanges 74 and 75, these orifices being predetermined and suitable for insuring a proper flow of water to the bottom of the de-sweetening column so as to obtain a substantially uniform distribution of water over the bottom of the tower and so as to obtain uniform distribution of the upwardly flowing water in the column.

The de-sweetening tower 16 has two side inlets 78 and 79, leading from the liquor space above the top of the body of adsorbent material and from the column below the top of this body, and these are connected to a differential pressure cell 80, the arrangement being similar to that of the cell 38 in Figs. 2 and 3, and such as to permit determination and regulation of the level of adsorbent in the tower.

The bottom of this de-sweetening tower is conical in shape and leads to the outlet 19, which is connected through the full opening valve 81 with a lower cylindrical portion 82 from which the upwardly extending pipe 26 carries the slurry of char, after de-sweetening, to the top of the de-ashing column. Sample lines 83 are located at different levels in this tower, with pipes extending inwardly to permit the drawing off of samples of the liquid therein.

The de-ashing column shown in Fig. 2 is of the same construction as the de-sweetening column shown in Figs. 13 and 14, and is operated in a similar manner, with introduction of water at the bottom of the de-ashing column through the line 24 (Fig. 2), withdrawal of water to the sewer through the line 25 from the top of the tower, and discharge of the slurry of de-ashed char through the line 26 to the point of further treatment by filtering and regeneration.

Figs. 15–18 show a modified form of construction of the top of one of the counter-current towers, and modified arrangement for supplying the adsorbent thereto in slurry form.

In this modification, the top of the counter-current column is indicated at 100, this corresponding to the top of the column 1 of Figure 3a, but differing therefrom.

The column 100 is shown as having an open top 101, or the top cut away. At the outlet level of the sugar solution, an annular trough 102 is arranged and secured to the wall of the column, and having a series, shown as 3, of inwardly extending trough members 103 connected to the trough 102 at their outer ends and welded together and to the plate 129 at their inner ends, and with supporting brackets 104. The trough members 103 have overflow notches 105 through which the sugar solution overflows into the trough. The sugar outlet from the trough 102 is through the pipe 106.

Within the upper portion of the column are two concentric cylinders 107 and 108 which form an annular space 109 between them, which extends up above the liquid level in the column and down below the liquid level to an extent similar to that of the soaking chambers of Fig. 3a. These cylinders are supported by the troughs 103, which extend through them and are welded to them. Roofs 110 cover the troughs, where they pass through the annular space between the two cylinders, to prevent adsorbent material, flowing downwardly through the annular space, from entering the overflow troughs.

At the top of the column of Fig. 15 is shown means for supplying the adsorbent, mixing it with purified sugar solution to form a slurry and for supplying the slurry to the column. Located above the column is a rotating distributing pipe 111 which discharges the slurry into the annular space between the two cylindrical members. This distributing pipe is rotated by a gear shown conventionally at 112, driven by a small gear 113, the arrangement being such as to cause the pipe 111 to rotate gradually and feed the slurry to the annular space during its rotation. The slurry is formed in the slurry chamber or sluice chamber 115 and passes through the line 114 to the rotating distributing pipe 111.

The adsorbent material, such as bone char or CAL, can be returned from the regenerating furnace in a slurry in water through the line 116 to a vibrating screen 117 to remove water from the adsorbent, which is drawn off through the line 118. The adsorbent, freed from most of its water, discharges into the hopper 119 which is open at the bottom and located just above the belt feeder 120, which withdraws adsorbent from the bottom of the hopper and discharges it into the slurry or sluice chamber 115, to which purified sugar solution is added through the line 121 to form a slurry of the adsorbent, which then passes downwardly and is distributed to the annular space in the column through the rotating distributing pipe.

The rate at which the adsorbent is supplied to the top of the column can be regulated by regulating the speed of the belt feeder 120, and the amount of purified sugar solution used to form the slurry can be regulated through the line 121.

The purified sugar solution used for making the slurry with the regenerated adsorbent is advantageously a portion of the purified sugar solution coming off from the top of the column. The return of purified sugar solution in the slurry aids in the spreading out of the adsorbent over the top of the column, and the returned sugar solution will be removed from the top of the column with the normal overflow.

The operation of the modified form of the column illustrated in Figs. 15 to 18 is in general similar to that described in connection with the operation of the column shown in Fig. 3, as previously described. The operation differs in the arrangement for withdrawing the purified sugar solution from the top of the column, and for supplying the adsorbent to the top of the column.

Figure 19:
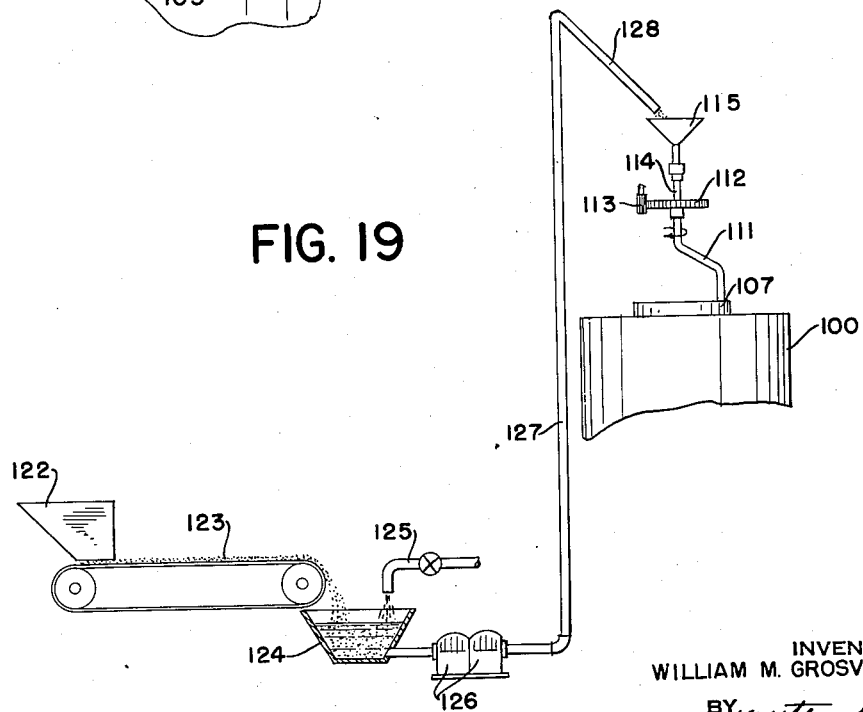
Fig. 19 shows a modified arrangement for supplying the adsorbent in slurry form to the top of the column such as illustrated in Fig. 15.

In Fig. 19, a further modification is shown, in a somewhat conventional and diagrammatic manner, for supplying bone char or other adsorbent to the top of the column in slurry form.

In Fig. 19, a hopper or supply 122 is provided for the regenerated and cooled bone char or other adsorbent. This hopper has an open bottom located slightly above the belt feeder 123 which conveys the char from the hopper 122 and discharges it into a slurry chamber 124, to which purified sugar solution is added through the pipe 125 to form a slurry of the adsorbent material. From the slurry chamber 124, the slurry is pumped by double diaphragm pumps 126 through the line 127, and the downwardly extending portion 128 of this line, into the slurry or sluice chamber 115, which is similar to that shown in Fig. 15, and supplies the slurry in a similar way to the column 100, which is shown conventionally in Figure 19 and is similar to the column 100 of Fig. 15.

The arrangement of Fig. 19 enables the regenerated adsorbent, or the fresh adsorbent, to be supplied in dried granular form, with regulation of the rate of supply controlled by the belt feeder 123. The making of the adsorbent into a slurry and the use of diaphragm pumps, enables the slurry to be carried to the top of the column, and discharged into the feeding device at the top of the column.

In the apparatus illustrated in Fig. 15, where the regenerated adsorbent is returned in a slurry with water, the removal of most of the water by a filter or vibrating screen will still leave some water wetting the adsorbent, as it is formed into a slurry with the purified sugar solution and supplied to the top of the tower. The arrangement of Fig. 19 has the advantage that the dry bone char or other adsorbent can be made into a slurry and pumped in slurry form to the top of the column. The adsorbent in this case is thoroughly wet with the purified sugar solution, and the air and other gases removed therefrom before it enters the column. And the dilution of the adsorbent by the sugar solution in the slurry aids in the spreading out of the adsorbent as it passes downwardly through the sugar solution in the annular space, and then through the sugar solution in the column below the annular chamber.

As an example illustrating the carrying out of the process in an apparatus such as illustrated in the drawings, with a column 12 feet in diameter and having a bed depth of bone char of 40 feet, there is fed near the bottom of the tower 85.9 gallons per minute of 63° Brix press filtered washed raw sugar liquor of optical density of 10.0 as determined on the Lumetron, at a temperature of 170° F. and a viscosity of about 8 cps.

To the top of the column is fed 75 pounds per minute of bone char having an average density of 50 pounds per cubic foot.

Of the 85.9 gallons per minute of sugar solution fed to the column, about 72.0 gallons per minute will ascend through the column and about 13.9 gallons per minute will go down the column to hydraulically transport the 75 pounds per minute of bone char out of the bottom of the column.

The 72 gallons per minute of sugar solution passing up the tower will come off the top of the column with an optical density of 0.6 or less, determined on the Lumetron, representing a color removal of 94% or more.

The 13.9 gallons per minute of sugar solution, and char associated with it, will pass from the bottom of the column up the hydraulic lift and will be discharged on the top of the filter or deliquorer where about 8.4 gallons per minute of liquor will be separated from the 75 pounds per minute of char, leaving 5.5 gallons per minute of liquor associated with the char, largely within its pores.

The 8.4 gallons per minute of liquor recovered is recycled to the feed stream ahead of the filters to remove bone char fines.

The char with its associated liquor is fed into the top of the de-sweetening column where it is counter-currently washed with 5.6 gallons per minute of 180° F. water. This produced 10.4 gallons per minute of sweet water of about 34° Brix coming off the top of the de-sweetening column.

From the bottom of the de-sweetening column the water carrying the char slurry is 0.1 Brix or less. It is fed without dewatering into the top of the de-ashing column, where it is washed counter-current with a volumn of water at least equal to the volume of char, e.g., 11.2 gallons per minute. This step in the process is essential in order that the char shall be washed free from the ash constituents it adsorbs from the sugar liquor passed over it. The water from this washing operation is sent to the sewer. The char slurry coming from the de-ashing column is pumped to the feed end of the revivification kiln where the char is de-watered, e.g., on a top-feed de-liquoring vacuum filter, to reduce the moisture content of the char to below 25%, and permit regeneration in a suitably designed rotary kiln or multiple hearth furnace.

The char is then cooled and transported mechanically over a screen and density separator to discard over-dense char and trash. It then passes by a mechanical elevator to the head of the column and passes over another screen to eliminate light or oversized contaminents, such as firebrick mortar, etc., from the regenerating system. It is then ready to be re-fed to the top of the column.

It is important, as previously pointed out, that the pH of the sugar solution passing up through the column should be maintained at a pH of about 7.0 or above. The cane sugar solutions fed to the bottom of the column have a pH above 7.0, usually around 7.2 to 7.5. It has been found that the sugar solution entering the column at its lower end has a tendency to decrease in pH on contact with the char. And it is important to prevent this reduction in pH from falling below about 7.0, since a further lowering of the pH interferes with proper color removal in the column. If, however, pH conditions are maintained so that the minimum pH in the sugar solution is about 7, the color removal, as the sugar solution passes up the column, is progressive, and the full column height is effective.

The sample lines 9 arranged at different levels in the column, as indicated in Figs. 2 and 3a, enable samples of the sugar solution to be withdrawn and the pH and color determined. In general, there is a reduction in the pH of the sugar solution from the bottom of the column to an intermediate portion, and an increase in the pH near the top of the column. Properly regenerated bone char may have a sufficiently high pH (as determined by testing the water extract), to maintain the pH of the sugar solution throughout the column at a pH of 7.0 or higher. Underburned or incompletely regenerated bone char, with a lower pH of the water extract, may not have a sufficient alkalinity to maintain the pH above 7.0 throughout the column, and, in this case, the pH of the cane sugar solution fed to the bottom of the column is increased. The feed sugar solution may thus have its pH increased by the addition of lime or calcium sucrate. The drawing off and testing of samples of the sugar solution at intermediate points of the column will enable the pH to be determined and controlled to insure that it is maintained throughout the column above about 7.0.

In the regenerating of the bone char, its alkalinity or pH (as determined by a water extract) can be increased by an alkaline wash of the bone char before regeneration. This can readily be accomplished by using alkaline water such as water containing lime, in the de-ashing column, with resulting increase in the alkalinity of the bone char after regeneration.

When the counter-current column is properly operating, with maintenance of the pH of the sugar solution above 7.0, the color removal from the sugar solution, as it passes upwardly through the column, is progressive, and the full height of the column is effectively utilized. The pH of the sugar solution entering the column at the bottom will first decrease somewhat and, before it reaches the top of the column, will increase somewhat, so that the minimum pH in the column will be at an intermediate point of the column. And the control of the process is effected by the withdrawing of samples from intermediate portions and determining the pH and controlling the process to maintain the minimum pH at about 7.0 or above.

It is also important, in carrying out the process, to supply the sugar solution to the bottom of the counter-current column free from dissolved air or other gases, since the liberation of such gases, when present, tends to cause channeling in the expanded bed.

The improved process of the present invention is of special advantage in the decolorizing of cane sugar solutions with bone char. Other decolorizing adsorbents can, however, be used. And other sugar solutions, other than cane sugar solutions, can be similarly treated.

In my companion application Serial No. 821,945, filed June 22, 1959, I have described the purification of beet sugar solutions, and more particularly for the removal of floc-forming materials therefrom, with the use of a granular floc-forming-material-adsorbent carbon such as the activated carbon-type CAL of the Pittsburgh Coke & Chemical Corporation. This CAL carbon can also advantageously be used in the present process for decolorizing cane sugar solutions. The use of this decolorizing adsorbent enables can sugar solutions to be reduced in color by 90% or more, with the use of a radically smaller amount of the adsorbent than when bone char is used. With the use of CAL, the sugar liquor to CAL ratio, by volume, can vary between 20:1 and 60:1.

Sugars produced by the hydrolysis of starch, such as corn sugar, can similarly be decolorized by the use of bone char or other suitable decolorizing adsorbents.

I claim:

1. The method of purifying sugar solutions in a continuous manner which comprises passing the hot sugar solution upwardly through an elongated vertical column countercurrent to a downwardly flowing bed of decolorizing adsorbent, continuously supplying the hot sugar solution, of constant viscosity, to the bottom of said column with uniform distribution of the sugar solution over the cross-sectional area of the bed and causing the sugar solution to flow upwardly as a substantially lineal ascending column of sugar liquor through the downwardly flowing bed at a rate to maintain said bed of adsorbent in an expanded state as a substantially lineal descending column of expanded adsorbent, maintaining a body of purified sugar solution above said bed, supplying adsorbent through the body of purified sugar solution to obtain a substantially uniform distribution of the adsorbent to the top of the bed and withdrawing spent adsorbent from the bottom of the bed, maintaining a sufficient length of countercurrent flow of the sugar solution and rate of adsorbent supply to effect purification of the sugar solution, and withdrawing the purified sugar solution uniformly from said body of sugar solution above the bed.

2. The method according to claim 1 in which a sugar solution containing dissolved gas is freed from dissolved gas before supplying it to the bottom of the column.

3. The method according to claim 1 in which the spent adsorbent is withdrawn from the bottom of the bed as a slurry in sugar solution.

4. The method according to claim 1 in which the adsorbent is supplied in dry form through a series of liquid containing zones extending into the body of sugar solution above the bed and discharging into said body of sugar solution above the top of said bed.

5. The method according to claim 1 in which the adsorbent is supplied in the form of a slurry in purified sugar solution and distributed over the surface of the bed.

6. The method according to claim 1 in which the spent adsorbent is withdrawn from the bottom of the bed as a slurry in sugar solution, the slurry treated to remove most of the sugar solution therefrom, and the resulting adsorbent with adhering sugar solution is supplied to the top of a desweetening column and passed downwardly therethrough with regulated upflow of water therethrough to produce a strong sweet water from the top of said desweetening column.

7. The process according to claim 6 in which the desweetened adsorbent is removed from the bottom of the desweetening tower as a slurry in water.

8. The process according to claim 7 in which the slurry of adsorbent in water is freed from most of its water before regeneration.

9. The method of purifying cane sugar solutions with bone char in a continuous manner which comprises passing the hot sugar solution upwardly through an elongated vertical column countercurrent to a downwardly flowing bed of bone char, continuously supplying the hot sugar solution of constant viscosity to the bottom of said column with uniform distribution of the sugar solution over the cross-sectional area of the bed and causing the sugar solution to flow upwardly as a substantially lineal ascending column of sugar liquor through the downwardly flowing bed at a rate to maintain said bed of bone char in an expanded state as a substantially lineal descending column of expanded adsorbent, maintaining a body of purified sugar solution above said bed, supplying bone char through the body of purified sugar solution to obtain a substantially uniform distribution of the bone char to the top of the bed and withdrawing spent bone char from the bottom of the bed, maintaining the sugar solution passing upwardly through said expanded bed at a pH above about 7.0 maintaining a sufficient length of countercurrent flow of the sugar solution and rate of bone char supply to effect purification of the sugar solution, and withdrawing the purified sugar solution uniformly from said body of sugar solution above the bed.

References Cited in the file of this patent

UNITED STATES PATENTS

| 329,331 | Matthiessen | Oct. 27, 1885 |
| 2,073,388 | Elliott et al. | Mar. 9, 1937 |

FOREIGN PATENTS

| 578,520 | Great Britain | July 2, 1946 |